United States Patent [19]

Schlicht

[11] Patent Number: 5,413,389
[45] Date of Patent: May 9, 1995

[54] CAST CONVOLUTED PIPING FLANGE

[76] Inventor: Gunter Schlicht, 15 Briones View, Orinda, Calif. 94563

[21] Appl. No.: 203,226

[22] Filed: Feb. 28, 1994

[51] Int. Cl.⁶ .............................................. F16L 19/00
[52] U.S. Cl. ................................ 285/363; 285/412; 285/414; 285/368; 285/416
[58] Field of Search ............... 285/363, 368, 412, 414, 285/416

[56] References Cited

U.S. PATENT DOCUMENTS

| 826,146 | 7/1906 | Crane | 285/412 |
|---|---|---|---|
| 893,434 | 7/1908 | Brinkman | 285/412 |
| 2,303,311 | 11/1942 | Gredell | 285/412 |
| 3,214,203 | 10/1965 | Mongodin | 285/414 |
| 3,455,583 | 7/1969 | Ray | 285/414 |
| 3,794,363 | 2/1974 | Schulz | 285/363 |
| 4,105,227 | 8/1978 | Ekberg et al. | 285/412 |
| 4,155,561 | 5/1979 | Dudy et al. | 277/168 |
| 4,458,924 | 7/1984 | Schlicht | 285/329 |
| 4,484,771 | 11/1984 | Schulz | 285/138 |
| 4,619,470 | 10/1986 | Overath et al. | 285/412 |
| 4,643,457 | 2/1987 | Press | 285/412 |

FOREIGN PATENT DOCUMENTS

| 601441 | 8/1934 | Germany | 285/412 |
|---|---|---|---|
| 837345 | 4/1952 | Germany | 285/414 |
| 858915 | 12/1952 | Germany | 285/414 |
| 2549282 | 5/1977 | Germany | 285/416 |
| 2621806 | 12/1977 | Germany | 285/416 |
| 315614 | 7/1929 | United Kingdom | 285/412 |

*Primary Examiner*—Eric K. Nicholson
*Attorney, Agent, or Firm*—Bielen, Peterson & Lampe

[57] ABSTRACT

A convoluted flange ring for a flange coupler in a piping system the flange ring having an annular bolting disk with an outer rim and an inner rim forming a U-shaped cross section, with the bolting disk having a transitional thickness for improved stress management, the thickness of the bolting disk increasing from the outer rim to the inner rim.

8 Claims, 1 Drawing Sheet

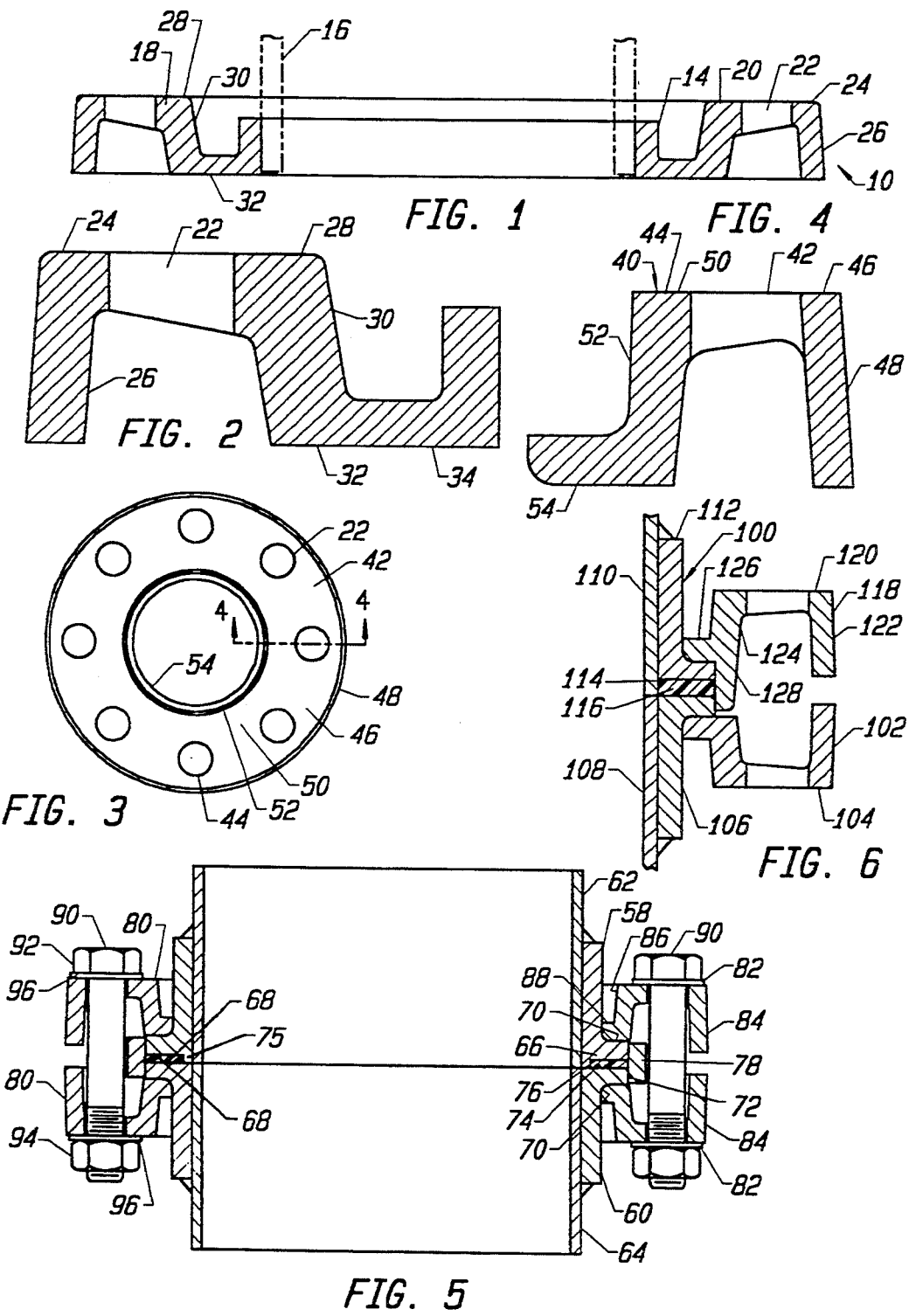

CAST CONVOLUTED PIPING FLANGE

BACKGROUND OF THE INVENTION

This invention relates to a pipe flange and more particularly to a type of pipe flange known as a convoluted flange. Pipe flanges are used to interconnect pipe sections and fittings to other pipe sections and fittings of various types. A convoluted flange utilizes a design in which an annular flange member has a U-shaped cross section to provide strength to the flange, which is reduced in weight and material content with resultant cost savings. A convoluted flange is described in Shultz, U.S. Pat. No. 4,484,771, issued Nov. 27, 1984. In that reference, a convoluted flange rim is described that is fabricated from a disk blank in a press. The thickness of the annular convoluted flange rim is therefor uniform. The flange rim is slipped over the end of a pipe section and retained by a flared end face that provides the contact or sealing face for an opposed flange on a pipe section or fitting. The convoluted flange rim provides the bolting ring to the flange rim of the mating fitting.

To prevent deformations in the flange rim of the lighter weight prior art convoluted flange from being transmitted as stresses to the pipe weldment, the outer periphery of the U-shaped rim contacts the abutting face of the opposing flange. This contact provides strength for mechanical support of the pipe connection without excessively stressing the pipe at or above the weld to a flared stub end fitting for seating the flange rim. This method of managing stresses in the prior art flange restricts the type of seals that can be used and requires great precision in selecting a seal according to proper thickness.

Conventional flanges are cast and ordinarily are relatively thick to prevent warpage on bolting. Because cast flanges are relatively inexpensive to produce, various systems have been devised to construct convoluted flanges with a cast metal flange rim. U.S. Pat. No. 4,458,924 of Schlicht, issued Jul. 10, 1984 entitled, "Bimetal Flange Connector" describes one such flange with a ductile iron convoluted flange rim. While the weight of the bimetal flange is reduced over conventional flanges, the process of fabricating the bimetal flange is more complicated and costly than conventional cast or forged flanges.

This inventor has constructed useful cast convoluted flanges that have the advantages of the Shultz flange without the requirement that the periphery of the flange rim contact the opposing flange face. However, to provide for the structural integrity for the physical connection to the connected flange, the cast convoluted flange is of greater thickness, thereby compromising the advantages of lighter weight and reduced material requirement characteristic of a convoluted flange. Furthermore, the added thickness results in a build-up of stresses transmitted to the pipe weldment making this design less than an ideal solution.

It is an object of this invention to provide a lightweight convoluted flange that is designed and configured to provide all of the advantages of a convoluted flange in an inexpensive casting or forging with controlled management of stresses. The objective is accomplished by using transitional changes in thickness of the flange member. The improved convoluted flange has greater flexibility and allows the flange bolts to compress a seal interposed between the compression faces with the desired force to effect proper sealing without transmitting excess stresses to the flange stub or pipe weldment.

Another object of this invention is to provide a flange assembly that includes a trapped flange seal and utilizes a convoluted flange member, preferably of the type that includes controlled management of stress. The trapped seal flange assembly is particularly useful for piping systems carrying abrasive slurries and eliminates turbulence that abrades the inside surface of the pipe. The trapped seal is also desirable for systems where it is necessary to minimize contact of the medium in the pipe with the seal, particularly a seal that may otherwise extrude into the piping passage on tightening of the flange bolts.

Another object of this invention is to provide a flange assembly where the flange rim through which the tightening bolts pass is rotatable on the pipe end for ease of alignment with the holes on the opposed flange to which it connects, and where the flange rim has a convoluted design that does not require the outer lip from contacting the opposed flange, thereby allowing for use of a greater variety of flange seals.

SUMMARY OF THE INVENTION

The improved convoluted flange assembly of this invention is designed for inexpensive fabrication by casting, forging, cold rolling or a variety of other forming methods suitable for the size, material and use of the flange. The flange has performance characteristics that exceed equivalent, heavier flat flanges with substantial savings in materials, manufacturing costs and other expenses associated with handling and shipping of goods in quantity. Although designed as a metal flange for use with welded pipe, the flange can be adapted to threaded pipe or even plastic fittings formed by different plastic molding processes.

The flange achieves its light-weight flexibility and superior stress distribution characteristics by a flange rim or bolting ring having a convoluted cross sectional configuration of varying thickness. At strategic places in the cross section of the U-shaped flange rim, the thickness is transitionally increased to generate uniform mechanical stresses in critical areas of the flange on tightening of the interconnection bolts. Stress management is accomplished without the necessity of the outer perimeter of the flange rim contacting the face of the opposed flange fitting. In this manner, the requirement for seals of precise thickness is not necessary to achieve the desired degree of sealing.

The improved convoluted flange assembly in one embodiment includes a trapped flange seal allowing use of an alignment ring to closely align segments of abutting pipe for elimination of fluid turbulence within the pipe. Although the use of an alignment ring has been incorporated in prior art piping systems designed and constructed by this inventor, the improvement of the trapped seal construction is a novel improvement that insures that the flange seal will not extrude into the piping passage.

The improved convoluted flange member with controlled stress distribution was designed using a comparative analysis of Von Mises stress levels. The resulting configuration of the convoluted flange member has a tapered thickness in the cross section of the segments making up the V-shaped flange member. The flange member is designed to minimize the diameter of the flange to avoid the cantilever or torquing effect that transmits stresses to the pipe at the pipe weld. The convoluted shape of the flange member and tapered thickness from inner hub to outer rim is designed to impart a flexibility to the flange construction that distributes stresses throughout the flange member and associated connecting member to the pipe. This stress distribution avoids the localized peak stress in the flange assembly, the weldment (for welded fittings) and the pipe. The result is that a lighter weight flange fitting has higher performance characteristics than standard fittings of comparable size. These and other features of the improved flange member and a piping flange assembly are described with greater detail in the Detailed Description of the Preferred Embodiments.

BRIEF DESCRIPTION OF THE DRAWINGS

FIG. 1 is a cross sectional view of the convoluted flange ring of this invention.

FIG. 2 is an enlarged view of a segment of the flange ring of FIG. 1.

FIG. 3 is a top plan view of a typical convoluted flange ring for a stub-end piping connection.

FIG. 4 is an enlarged cross sectional view taken on the lines 4—4 in FIG. 3.

FIG. 5 is a cross sectional view of a flange assembly with a trapped seal using convoluted flange rings.

FIG. 6 is a partial cross sectional view of an alternate flange assembly with a trapped seal.

DETAILED DESCRIPTION OF THE PREFERRED EMBODIMENTS

Referring to FIGS. 1 and 2, a flange member for use in a piping system 10 includes an improved convoluted flange ring 12. In the embodiment of FIGS. 1 and 2, the improved flange ring 12 is integral with a pipe coupler in the form of a hub 14. The hub 14 slips over the end of a pipe 16 (shown in phantom in FIG. 1) and is welded thereto.

It is to be understood that the improved flange ring 12 can be utilized as part of a variety of different flange members for interconnecting pipe to pipe, pipe to fittings or fittings to fittings. Depending on the arrangement, the flange ring 10 may be fixed or rotatable with respect to the coupler element that connects the flange ring to the pipe or fitting.

In the embodiment of FIG. 1, the flange ring 12 includes an annular bolting disk 18 having a flat bolting face 20 and a series of spaced bolting holes 22 around the face 20. The bolting disk 18 has an outer portion 24 with an outer rim 26, and an inner portion 28 with an inner rim 30. The inner rim 30 has a foot portion 32 that in the embodiment of FIGS. 1 and 2 forms both parts of the hub 14 and a sealing face 34 against which is compressed a sealing ring (not shown).

To manage stresses applied during interconnection of flange members, the improved convoluted flange ring has a transitional thickness. The outer rim 26 is maintained relatively thin and the bolting disk 18 tapers in thickness from its outer portion 24 to its inner portion 28. This increase in thickness together with the slight obtuse angular orientation of the outer rim 26 and inner rim 30 with respect to the flat face 20 of bolting disk 18, allows relief of the torsional stresses developed from the cantilever-like arrangement of the flange member on bolting to a complimentary flange member with a seal interposed between the members proximate the inner hub.

The relatively thick inner portion of the bolting disk directs compression forces through the inner rim 30 to the foot portion 32 instead of to the relatively thin portions of the hub 14.

With reference of FIGS. 3-5, alternate embodiments of the convoluted flange ring for flange members are shown. For example, the convoluted flange ring 40 of FIGS. 3 and 4 includes a bolting disk 42 with a flat bolting face 44 with an outer portion 46 of the disk 42 having a unitary outer rim 48 and an inner portion 50 with an inner rim 52. The bolting disk 42 has the characteristic transitional thickness increasing from the outer portion 46 to the inner portion 50. The flange ring 40 does not include an inner hub, and the inner rim 52 terminates in a contoured foot 54 that engages a coupling element on a pipe or fitting. Since it is desirable to minimize the torsional effect of the clamping bolts, the foot 54 may be truncated as illustrated in the assembly of FIG. 5.

Referring to FIG. 5, first and second stub connectors 58 and 60 are welded to the abutted ends of two pipe sections 62 and 64. The stub connectors 58 and 60 have flared ends 66 with a sealing face 68, a clamping shoulder 70 and a cylindrical edge 72. The stub end 58 includes a recess 74 formed by a lip 75 on one stub connector 58 and the sealing faces 68 into which is installed a seal 76 that is of greater thickness than the width of the recess. The seal 76 is trapped in the recess 74 by a cylindrical band 78 that engages the juxtaposed cylindrical edges 72 of the flared ends of the stub connectors and forces the seal to be compressed on joining the opposed flange members.

In the embodiment of FIG. 5, the opposed flange rings 80 are identical in construction with a bolting disk 82, an outer rim 84, an inner rim 86 and a truncated foot 88. The foot 88 on each flange ring engages the respective shoulder 70 on the stub connectors 58 and 60. Bolt units 90, which include bolts 92, nuts 94 and washers 96 clamp the flange members together, compressing the seal 76 on tightening.

Referring now to the embodiment of FIG. 6, a modified flange assembly 100 is shown. A first flange member 102 includes a flange ring 104 configured similar to the flange rings of FIG. 5. A stub connector 106 is welded to the end of a pipe section 108 that abuts the end of an opposed pipe section 110. The opposed pipe section 110 includes a stub connector 112 set back from the pipe end to form the recess 114 into which a seal 116 is installed. The complimentary flange ring 118 includes a bolting disk 120, an outer rim 122, an inner rim 124 with a foot 126 and with a projecting band 128 that is a unitary element of the flange ring 118. The projecting band 128 traps the seal 116 in the same manner as the band in the embodiment of FIG. 5. The flange rings of the flange assemblies of FIGS. 5 and 6 preferably include the transitional thickness of the previously described flange rings.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An improved convoluted flange ring for a flange member in a piping connector, the flange ring comprising:

an annular bolting disk with concentric inner and outer portions having a flat bolting face with a plurality of bolting holes uniformly spaced around the disk;

an outer rim portion integrally joined with the outer portion of the bolting disk;

an inner rim portion integrally joined with the inner portion of the bolting disk, wherein the integrated bolting disk, inner rim portion and outer rim portion form a unitary flange ring with a U-shaped ring cross section that is configured for stress distribution, where the annular bolting disk has a thickness and the thickness of the bolting disk transitionally increases from the outer portion of the bolting disk to the inner portion of the bolting disk in substantial accordance with finite element stress analysis calculations for optimizing stress management and distribution in the flange ring when connecting a piping connector having the flange member with the improved convoluted flange ring to another piping connector.

2. The improved convoluted flange ring of claim 1 wherein the inner rim portion connects to the inner portion of the bolting disk at an obtuse angle and has a foot portion displaced from the juncture with the bolting disk.

3. The improved convoluted flange ring of claim 2 wherein the thickness of the inner rim portion decreases from the juncture with the inner portion of the bolting disk to the foot portion of the inner rim portion of the flange ring.

4. The improved convoluted flange ring of claim 2 wherein the foot portion of the inner rim portion of the flange ring includes a hub, the hub being constructed with connecting means for connecting the flange ring to a piping component.

5. The improved convoluted flange ring of claim 2 in combination with a stub connector, the combination forming a flange member for a piping component, the stub connector having a first end connectable to a piping component and a second end with a flared portion forming a seal face and a clamping shoulder wherein the foot portion of the inner rim portion of the flange ring engages the shoulder of the flared portion of the stub connector when the flange ring is bolted to a complimentary flange member.

6. A convoluted flange coupler for a trapped seal, the coupler comprising:

first and second facing stub connectors connected to opposed abutting ends of pipe, the stub connectors having flared ends with opposed, displaced sealing faces when the ends of the pipe to which the stub connectors connect abut wherein a recess is formed for a seal, the flared ends each having a coupling shoulder and terminal cylindrically edge;

a seal in the recess interposed between the displaced sealing faces of the stub connectors;

an external circumferential locking band encircling and engaging the outside of the terminal cylindrical edges of the flared ends of the stub connectors, the locking band having a width that spans the terminal cylindrical edges of the flared ends and traps the seal between the sealing faces of the stub connectors;

first and second convoluted flange rings, one on each of said stub connectors, each ring having an annular bolting disk with a flat bolting face and a plurality of bolting holes uniformly spaced around the disk, the disk having concentric inner and outer portions, an outer rim portion integrally joined with the outer portion of the bolting disk, an inner rim portion integrally joined with the outer portion of the bolting disk, the inner rim portion having a foot portion displaced from the juncture with the bolting disk, the foot portion being engageable with the shoulder of the flared end of the stub connector; and a plurality of bolt units interconnecting the flange rings and compressing the seal trapped between the sealing faces of the stub connectors.

7. The convoluted flange ring of claim 6 wherein the locking band projects from and is unitary with the foot portion of one of the convoluted flange rings.

8. The convoluted flange ring of claim 6 wherein the bolting disk has a thickness that increases from the outer portion to the inner portion of the disk.

* * * * *